(12) United States Patent
Ishida

(10) Patent No.: US 6,514,062 B2
(45) Date of Patent: Feb. 4, 2003

(54) DIE FOR USE IN AN UNDERWATER GRANULATING APPARATUS

(75) Inventor: Yasuhiko Ishida, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 23 days.

(21) Appl. No.: 09/757,573

(22) Filed: Jan. 11, 2001

(65) Prior Publication Data

US 2001/0012527 A1 Aug. 9, 2001

(30) Foreign Application Priority Data

Jan. 17, 2000 (JP) ........................................ 2000-007335

(51) Int. Cl.[7] .............................................. B29C 47/30
(52) U.S. Cl. ................... 425/67; 425/378.2; 425/382.2; 425/463; 425/72.2
(58) Field of Search ......................... 425/67, 308, 309, 425/310, 311, 313, 315, 316, DIG. 230, 72.2, 378.2, 382.2, 463; 83/675, 607, 906

(56) References Cited

U.S. PATENT DOCUMENTS

| | | | | |
|---|---|---|---|---|
| 3,391,657 A | * | 7/1968 | Reese | ........................ 425/461 |
| 4,752,196 A | * | 6/1988 | Wolfe, Jr. | .................... 264/142 |
| 4,801,257 A | * | 1/1989 | Lenk | ........................ 264/176.1 |
| 4,822,546 A | * | 4/1989 | Lohkamp | ..................... 264/143 |
| 4,934,916 A | * | 6/1990 | Lambertus | ................... 264/142 |
| 5,017,116 A | * | 5/1991 | Carter et al. | ........... 264/172.14 |
| 5,417,907 A | * | 5/1995 | Ohhata et al. | ............... 264/143 |
| 5,714,173 A | * | 2/1998 | Matsuo | ........................ 425/313 |

* cited by examiner

Primary Examiner—Jan H. Silbaugh
Assistant Examiner—Joseph S. Del Sole
(74) Attorney, Agent, or Firm—Sughrue Mion, PLLC

(57) ABSTRACT

Two rows of nozzles 4a and 4b whose open ends are formed as orifices 2 of a die are respectively made to communicate with introducing slots 3 of orifice units 6, and jackets 7 for temperature regulation are each disposed between the orifice units 6. First nozzle portions 41a and 41b of a small diameter are provided in the nozzles 4a and 4b for the purpose of reducing a dead space where the orifices 2 cannot be disposed due to the jackets 7, and the jackets 7 are disposed at their depthwise position. The first nozzle portions 41a and 41b are disposed eccentrically in mutually opposite directions with respect to second nozzle portions 42a and 42b having the same diameter as the orifice 2, thereby making it possible to substantially reduce the dead space.

12 Claims, 5 Drawing Sheets

DIE FOR USE IN AN UNDERWATER GRANULATING APPARATUS

BACKGROUND OF THE INVENTION

1. Field of the Invention

The present invention relates to a die for use in a plastic granulating apparatus of a so-called underwater cutting type for consecutively cutting strands extruded by the die into pellets by a rotating blade in a cutter box into which cooling water is circulatingly supplied.

2. Description of the Related Art

A description will be given of a conventional example of a die for use in a plastic granulating apparatus of the underwater cutting type. As shown in FIG. 6, a die 101 has a plurality of orifices 102 provided at intervals in an annular zone in which extruded strands can be cut by a rotating blade. Each orifice 102 has a large-diameter introducing hole 102a formed on an introducing surface 101a side of the die 101 and a small-diameter discharging hole 102b formed on a discharge surface 101b side thereof, thereby making it possible to extrude a strand of a predetermined outside diameter (pellet outside diameter).

With the above-described conventional technique, since the orifices are each formed by the large-diameter introducing hole and the small-diameter discharging hole, and are open in an annular zone of the die having a limited area, there is a limit to the number of orifices which can be provided at this annular zone having the limited area, and it is impossible to cope with the need for an increased capacity.

In addition, in the plastic granulating apparatus of the underwater cutting type, since cooling water is circulatingly supplied to a cutter box, the discharging surface of the die is exposed to cooling water. Hence, there is a possibility that clogging can occur due to the cooling and solidification of the molten plastic within the orifice. In a case where jackets for temperature regulation are disposed on the die to prevent the clogging, an interval between the orifices on both sides of each jacket must be made large, so that the so-called dead space occurs. As a result, there has been a problem in that the number of orifices which can be provided decreases.

SUMMARY OF THE INVENTION

The invention has been devised in view of the problem of the above-described conventional technique, and its object is to provide a die for use in a plastic granulating apparatus of the underwater cutting type which makes it possible to cope with the need for an increased capacity by providing numerous orifices by reducing the dead space occurring in areas where the jackets for temperature regulation are disposed.

To attain the above object, a plastic granulating apparatus of an underwater cutting type in accordance with the invention has a die for use in a plastic granulating apparatus of an underwater cutting type in which a predetermined area is provided in an annular shape on a discharging side surface of a die base material, and a plurality of nozzles whose open ends are formed as a multiplicity of orifices distributed over a substantially entire area of the predetermined area are respectively made to communicate with introducing slots in an introducing side surface of the die base material, characterized in that each of the nozzles has a small-diameter portion having a diameter smaller than an opening diameter of the orifice, and a jacket for temperature regulation is disposed at a depthwise position where the small-diameter portion is disposed.

In addition, a die for use in a plastic granulating apparatus of an underwater cutting type in which a predetermined area is provided in an annular shape on a discharging side surface of a die base material, and a plurality of nozzles whose open ends are formed as a multiplicity of orifices distributed over a substantially entire area of the predetermined area are respectively made to communicate with introducing slots in an introducing side surface of the die base material may be characterized in that each of the nozzles has an eccentric portion disposed eccentrically with respect to the orifice, and a jacket for temperature regulation is disposed at a depthwise position where the eccentric portion is disposed.

A space for a jacket for temperature regulation is secured as a small-diameter portion having a diameter smaller than the opening diameter of the orifice is provided at a predetermined depthwise position in the nozzle whose open end is formed as each orifice.

In addition, the space for a jacket for temperature regulation may be secured as an eccentric portion disposed eccentrically with respect to the orifice is provided at a predetermined depthwise position in the nozzle whose open end is formed as each orifice.

Since dead space occurring due to the provision of the jackets is reduced to increase the number of orifices in the discharging side surface of the die, and the discharging side surface having a limited area is thereby effectively utilized, it is possible to cope with the need for an increased capacity.

If the small-diameter portion of the nozzle is disposed eccentrically with respect to the orifice, the aforementioned dead space can be further reduced, and it is possible to make optimum use of the discharging side surface of the die.

DETAILED DESCRIPTION OF THE PREFERRED EMBODIMENTS

Figure 1A:
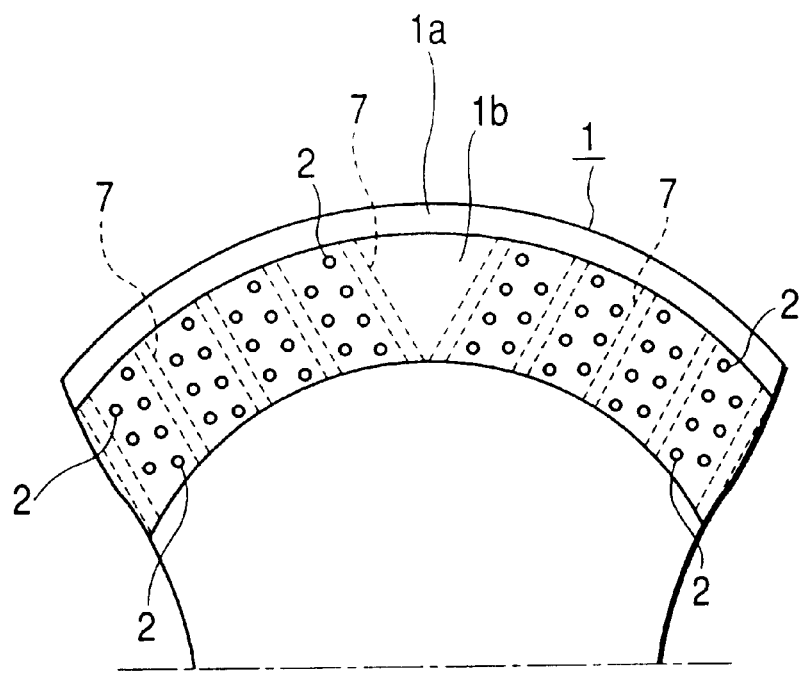
FIG. 1A is a schematic partial plan view of a discharging side surface of a die for a plastic granulating apparatus of an underwater cutting type in accordance with an embodiment.

Referring to the drawings, a description will be given of an embodiment of the invention.

Figure 2A:
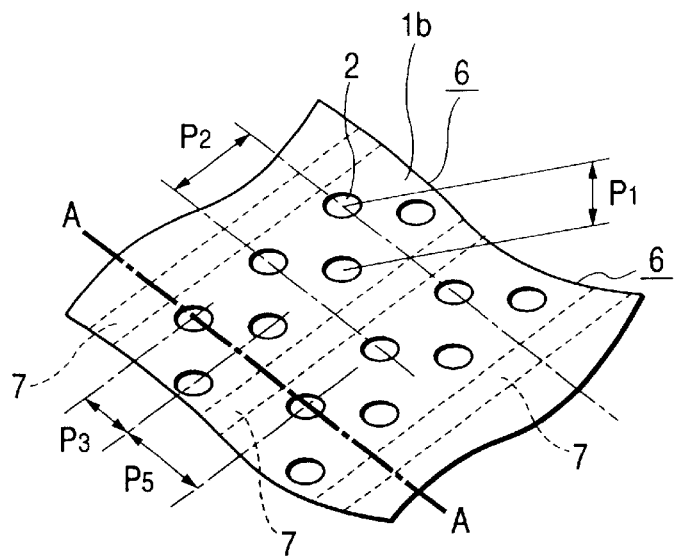
FIG. 2A is an enlarged partial plan view illustrating the arrangement of orifices of orifice units on the discharging side surface.

As shown in FIG. 1A, a hardened layer 1b formed of a material excelling in wear resistance, such as a tungsten-carbide base alloy or a titanium-carbide base alloy, is provided in an annular shape on a discharging side surface 1a of a die base material 1 so as to prevent wear attributable to the rotation of a rotating blade. As a plurality of orifice units 6 (see FIG. 2) are provided at intervals in a circumferential direction in a zone corresponding to this annular hardened layer 1b, a plurality of orifices 2 are open in such a manner as to be distributed over a substantially entire area of the hardened layer 1b.

In this embodiment, the orifice units 6 are arranged as follows.

Figure 1B:
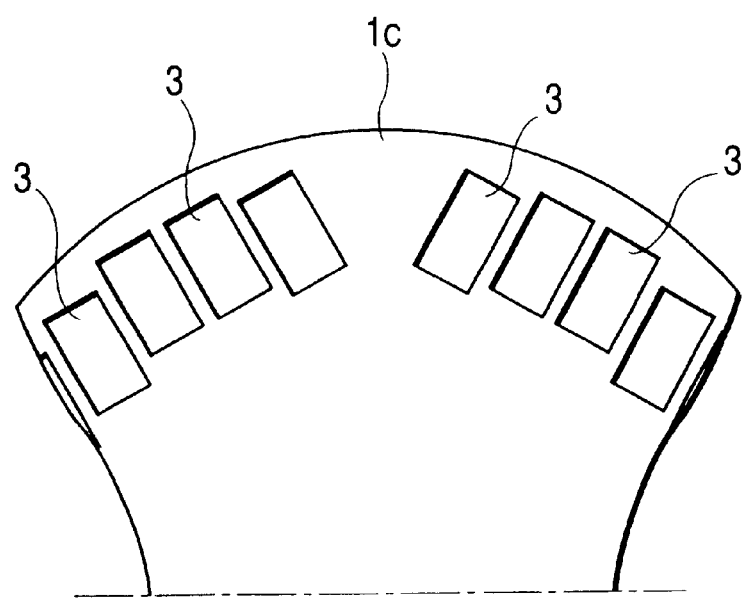
FIG. 1B is a schematic partial plan view of an introducing side surface of a die for a plastic granulating apparatus of an underwater cutting type in accordance with an embodiment.
Figure 2B:
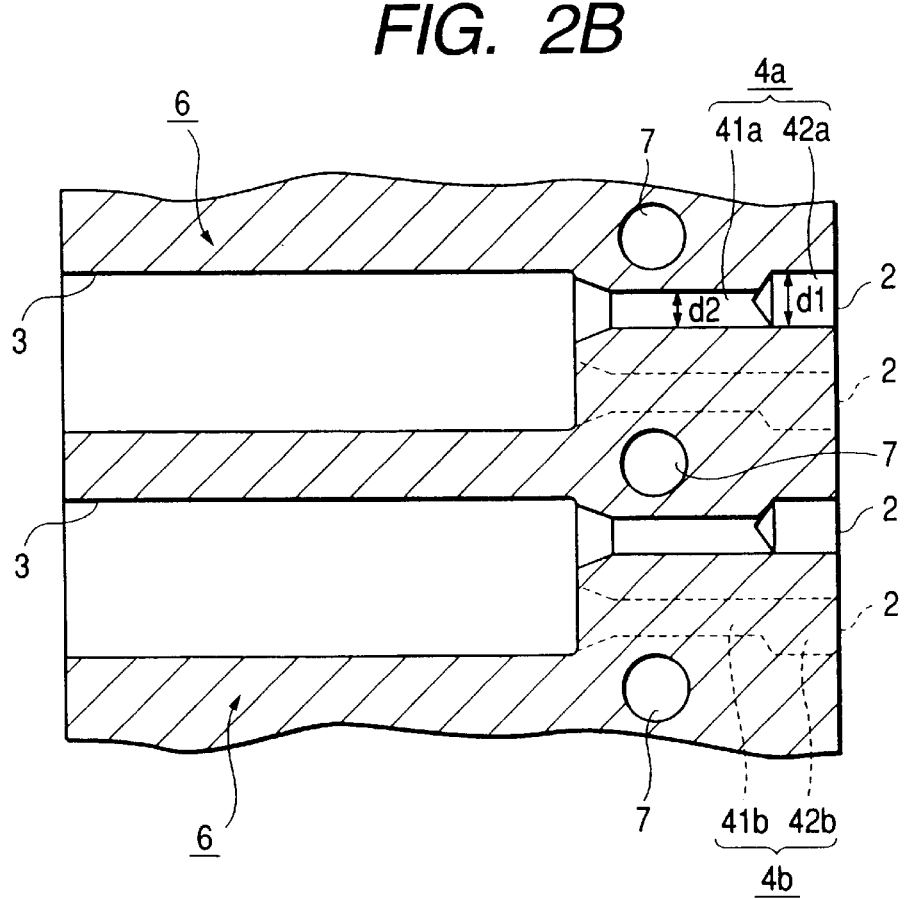
FIG. 2B is a partial cross-sectional view taken along line A—A in FIG. 2A.

As shown in FIG. 1B, in an introducing side surface 1c of the die base material 1 opposite to the discharging side surface 1a, introducing slots 3 each having a substantially rectangular cross-sectional shape are open substantially radially at intervals in the circumferential direction in the zone corresponding to the annular hardened layer 1b. As shown in FIG. 2B, two rows of nozzles 4a and 4b are formed in the longitudinal direction of each introducing slot 3 in the bottom of the introducing slot 3 in such a manner as to communicate with each other so as to form each orifice unit 6, and open ends of the nozzles 4a and 4b are formed as the orifices 2.

The first row of nozzles 4a and the second row of nozzles 4b of each orifice unit 6 are respectively provided with first nozzle portions 41a and 41b which are small-diameter portions disposed on the introducing slot 3 side at a predetermined depthwise position, as well as second nozzle portions 42a and 42b which are large-diameter portions located on the die opening side.

Namely, each of the second nozzle portions 42a and 42b has a hole diameter $d_1$ identical to the opening diameter of the orifice 2, while each of the first nozzle portions 41a and 41b has a hole diameter $d_2$ smaller than the opening diameter of the orifice 2. Jackets 7 for temperature regulation provided for preventing the clogging of the nozzles 4a and 4b are each disposed between the first nozzle portions 41a and 41b of mutually adjacent ones of the orifice units 6.

Figure 3:
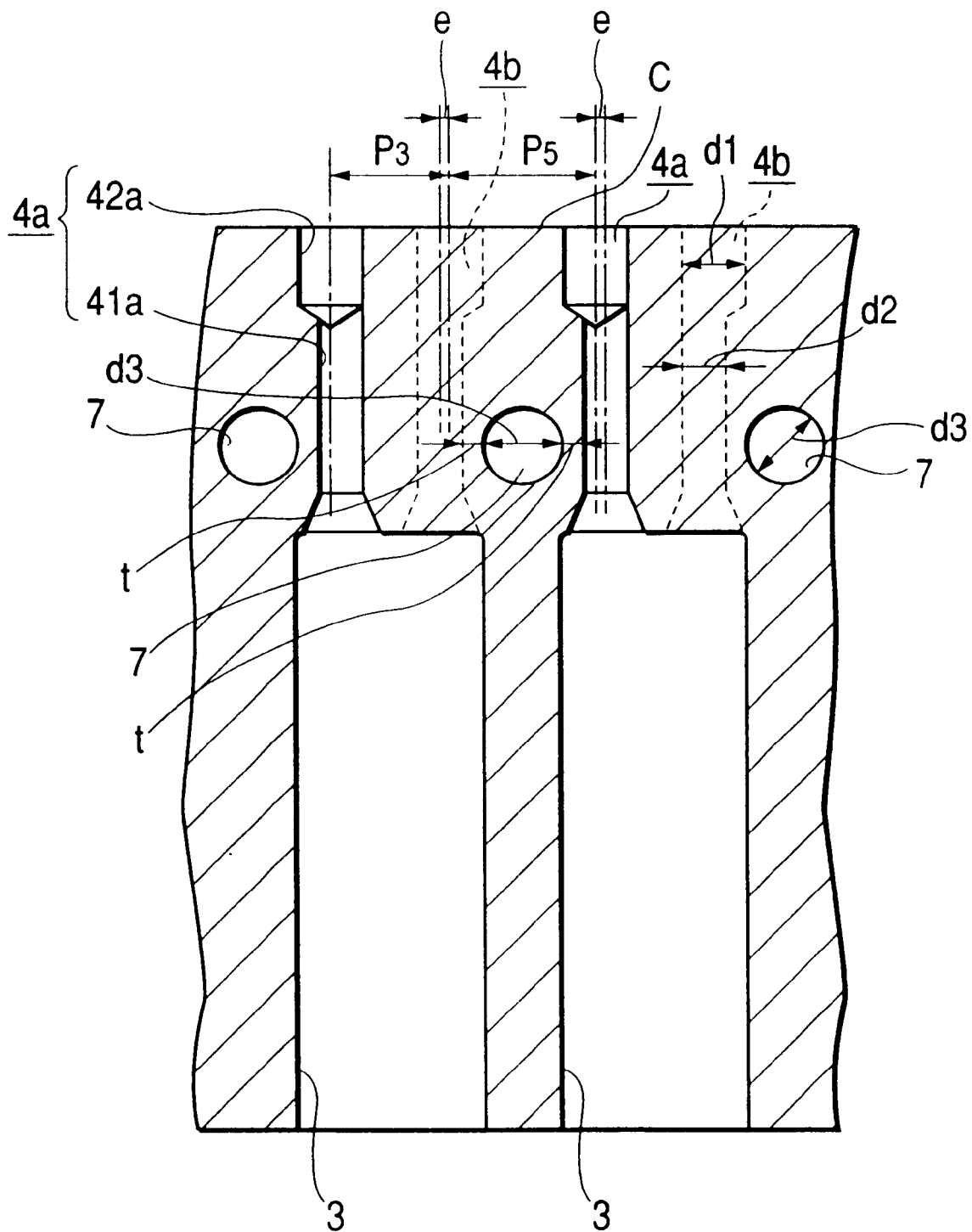
FIG. 3 is a diagram explaining a method of calculating a nozzle pitch between orifice units.

As shown in FIG. 3, the first nozzle portions 41a in the first row of nozzles 4a and the first nozzle portions 41b of the second row of nozzles 4b of each orifice unit 6 are respectively disposed eccentrically in mutually opposite directions with respect to the second nozzle portions 42a and 42b, and are thus arranged such that the nozzle pitch $P_5$ between the adjacent orifice units 6 can be reduced as much as possible while securing the space for disposing the jacket 7 between the first nozzle portions 41a and 41b located at the predetermined depthwise position, thereby making it possible to increase the number of orifices 2 which are open in the discharging side surface 1a of the die.

A molten resin which flowed into the introducing slots 3 of the orifice units 6 is compressed by the small-diameter first nozzle portions 41a and 41b, then pass through the large-diameter second nozzle portions 42a and 42b, and are extruded uniformly into a cutter box (not shown) from the orifices 2. Strands which were extruded into the cutter box are cooled by cooling water which is circulatingly supplied into the cutter box, during which the strands expand and assume diameters larger than the inside diameter $d_1$ of the orifice 2. For this reason, both nozzle pitches $P_1$ and $P_2$ (see FIG. 2A) in two directions inside each orifice unit 6 are preferably set in ranges two to three times as large as the opening diameter $d_1$ of the orifice 2.

Accordingly, the first row of nozzles 4a and the second row of nozzles 4b are arranged in a mutually offset manner so as to minimize the interval $P_3$ between the first row and the second row while securing minimum values of both nozzle pitches $P_1$ and $P_2$. The number of orifices is increased by reducing the interval $P_3$ between the nozzle rows in the above-described manner.

In addition, the jackets 7 for temperature regulation are disposed between the adjacent orifice units 6, as described before. For example, in a case where, as shown in FIG. 4, the nozzles 4a and 4b of each orifice unit 6 are not provided with the small-diameter first nozzle portions and are constituted only by the second nozzle portions having the same diameter as the opening diameter $d_1$ of the orifice 2, the nozzle pitch $P_4$ at a portion where the jacket 7 is disposed must be made large, so that a belt-shaped dead space where the orifices 2 are not present is formed in the discharge side surface 1a of the die.

Accordingly, in this embodiment, as the first nozzle portions 41a and 41b with the small diameter $d_2$ are disposed eccentrically in mutually opposite directions on the upstream side of the second nozzle portions 42a and 42b having the same diameter as the opening diameter $d_1$ of the orifice 2 of each orifice unit 6, the dead space is reduced and the number of orifices of the die as a whole is increased while securing the space for the jackets 7 which are disposed at a predetermined depth in the orifice unit 6.

Figure 4:
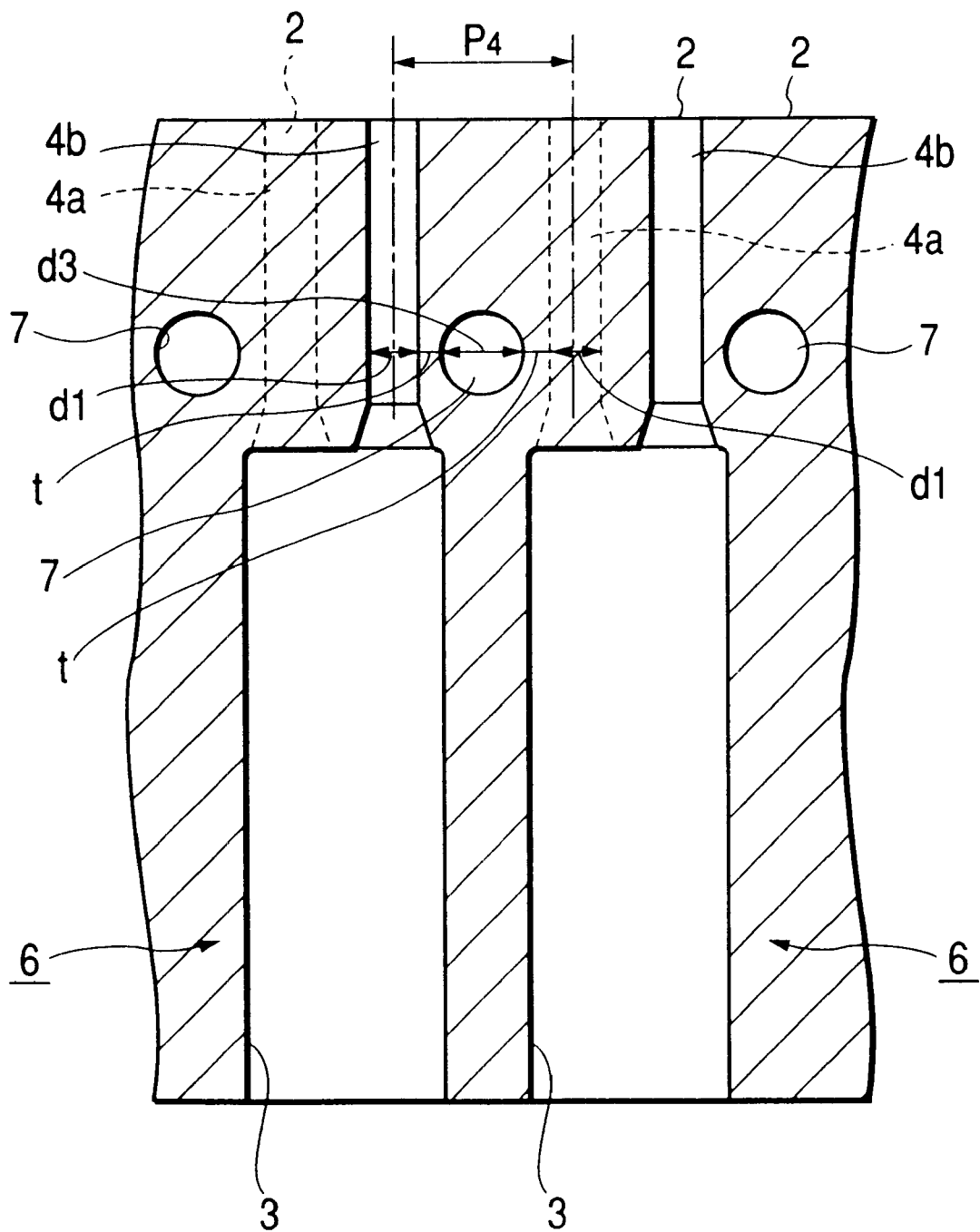
FIG. 4 is a diagram illustrating a conventional case in which nozzles are not provided with small-diameter portions or eccentric portions.

More specifically, in the case of a die in which, as shown in FIG. 4, the nozzles 4a and 4b are not provided with the first nozzle portions at the depth of the jackets 7 and are constituted only by the second nozzle portions having the same hole diameter $d_1$ of the orifice 2, if the hole diameter of the jacket 7 is $d_3$ and the thickness necessary between the nozzles 4a and 4b is t, the nozzle pitch $P_4$ at the portion where the jacket 7 is incorporated can be expressed by the following formula:

$$P_4 = d_3 + 2t + d_1 \qquad (1)$$

In contrast, in this embodiment, since the amount of eccentricity e of each of the first nozzle portions 41a and 41b with the small diameter $d_2$ with respect to each of the second nozzle portions 42a and 42b with the large diameter $d_1$ is $(d_1-d_2)/2$, the nozzle pitch $P_5$ at the portion where the jacket 7 is incorporated, i.e., between the adjacent orifice units 6, can be expressed by the following formula:

$$P_5 = d_3 + 2t + d_2 - (d_1 - d_2) \qquad (2)$$

From Formulae (1) and (2), we have $$P_4 - P_5 = 2(d_1 - d_2)$$

Since the nozzle portions each having a diameter smaller than the orifice diameter are provided in the nozzles in an eccentric manner in mutually opposite directions, it is possible to substantially reduce the dead space where the orifices are not present, and increase the number of orifices which are disposed in the die.

It should be noted that, in this embodiment, the small-diameter portions, i.e., the first nozzle portions, of the nozzles which are arranged in two rows are arrayed eccentrically in mutually opposite directions, these small-diameter portions need not necessarily be eccentric, and may be concentric with the large-diameter portions, i.e., the orifices, if a space necessary for the jackets can be secured in the small-diameter portions of the nozzles.

Figure 5:
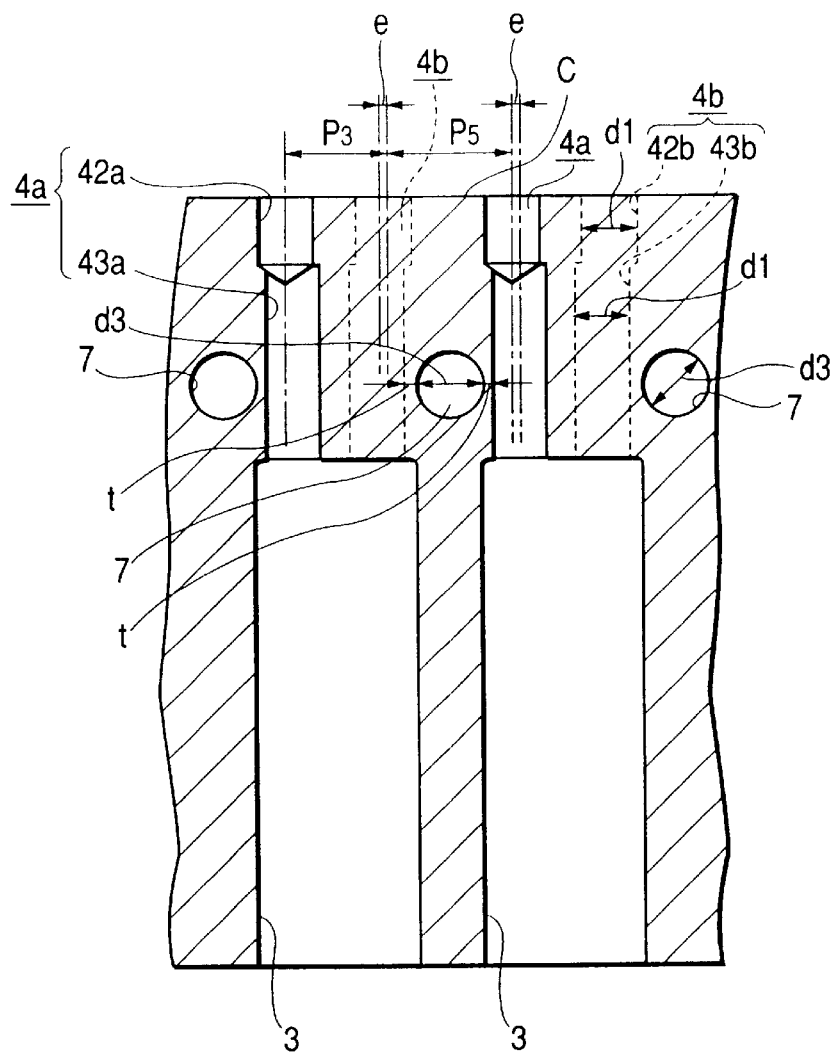
FIG. 5 is a partial cross-sectional view illustrating a modification.
Figure 6:
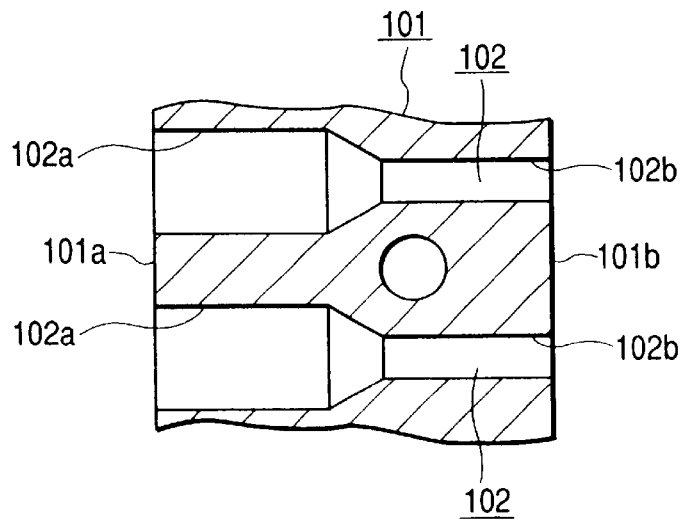
FIG. 6 is a partial cross-sectional view illustrating an example of a conventional die which is used in a plastic granulating apparatus of the underwater cutting type.

In addition, as shown in FIG. 5, first nozzle portions 43a and 43b which are only made eccentric to the second nozzle portions 42a and 42b without providing the small-diameter portions in the nozzles 4a and 4b maybe provided, and the jackets 7 for temperature regulation maybe disposed at their depthwise position. In this case, the nozzle pitch $P_5$ can be expressed by the following formula:

$$P_5 = d_3 + 2t + d_1 - 2e \qquad (3)$$

From Formulae (1) and (3), we have $$P_4 - P_5 = 2e$$

Thus the dead space can be reduced by two times the amount of eccentricity e of the first nozzle portion which is an eccentric portion.

Incidentally, it goes without saying that even if the first nozzle portions are larger in diameter than the second nozzle portions, i.e., $d_2>d_1$, the dead space can be reduced if the amount of eccentricity of the first nozzle portions is made large.

Since the present invention is arranged as described above, the following advantages are offered.

Since a multiplicity of nozzles can be provided in the annular hardened layer having a limited area in the die without making the diameter of the die large, it is possible to cope with the need for an increased capacity.

What is claimed is:

1. A die for use in an underwater plastic granulating apparatus comprising:

a plurality of orifices distributed over a substantially entire area of a predetermined area formed in an annular shape on a discharging side surface of a die base material;

a plurality of nozzles formed in said die base material and respectively opening to said orifices;

an introducing slot formed in an introducing side surface of said die base material and communicating with said nozzles; and a jacket for temperature regulation disposed in said die base material;

wherein, each of said nozzles has a small-diameter portion having a diameter smaller than an opening diameter of said orifice, and said jacket for temperature regulation is disposed at a depthwise position where said small-diameter portion is formed; and wherein said small-diameter portion of each of said nozzles is formed eccentrically with respect to a large-diameter portion having a diameter identical to the opening diameter of said orifice.

2. A die for use in an underwater plastic granulating apparatus according to claim 1, wherein, said predetermined area is constituted by a wear resistant hardened layer.

3. A die for use in an underwater plastic granulating apparatus according to claim 1, wherein a nozzle pitch $P_2$ of said orifices is set in a range two to three times as large as said opening diameter of said orifices;

wherein said nozzle pitch $P_2$ is at a portion where said orifices are located adjacent to one another in a row.

4. A die for use in an underwater plastic granulating apparatus comprising:

a plurality of orifices distributed over a substantially entire area of a predetermined area formed in an annular shape on a discharging side surface of a die base material;

a plurality of nozzles formed in said die base material and respectively opening to said orifices;

an introducing slot formed in an introducing side surface of said die base material and communicating with said nozzles; and a jacket for temperature regulation disposed in said die base material;

wherein, each of said nozzles has a small-diameter portion having a diameter smaller than an opening diameter of said orifice, and said jacket for temperature regulation is disposed at a depthwise position where said small-diameter portion is formed; and wherein said nozzles are arranged in at least two rows to constitute an orifice unit, and said small-diameter portion of each of said nozzles is formed eccentrically with respect to a large-diameter portion having a diameter identical to the opening diameter of said orifice.

5. A die for use in an underwater plastic granulating apparatus according to claim 4, wherein said rows of said nozzles are arranged in a mutually offset manner.

6. A die for use in an underwater plastic granulating apparatus according to claim 4, wherein a small diameter portion of a nozzle in a first row is arrayed eccentrically in a mutual opposite direction to a small diameter portion of a nozzle in a second row.

7. A die for use in an underwater plastic granulating apparatus according to claim 4, wherein a nozzle pitch $P_5$ at a portion where the jacket is incorporated is expressed by $P_5=d_3+2t+d_2-(d_1-d_2)$;

wherein $d_3$ is a hole diameter of said jacket;

wherein t is a thickness between the jacket and each of the nozzles;

wherein $d_2$ is a diameter of said small-diameter portion; and wherein $d_1$ is diameter of said large-diameter portion.

8. A die for use in an underwater plastic granulating apparatus comprising:

a plurality of orifices distributed over a substantially entire area of a predetermined area formed in an annular shape on a discharging side surface of a die base material;

a plurality of nozzles formed in said die base material and respectively opening to said orifices;

an introducing slot formed in an introducing side surface of said die base material and communicating with said nozzles; and a jacket for temperature regulation disposed in said die base material;

wherein, each of said nozzles has an eccentric portion formed eccentrically with respect to said orifice, and said jacket for temperature regulation is disposed at a depthwise position where said eccentric portion is formed.

9. A die for use in an underwater plastic granulating apparatus according to claim 8, wherein, said predetermined area is constituted by a wear resistant hardened layer.

10. A die for use in an underwater plastic granulating apparatus according to claim 8, wherein said nozzles are arranged in at least two rows to constitute an orifice unit.

11. A die for use in an underwater plastic granulating apparatus according to claim 10, wherein a small diameter portion of a nozzle in a first row is arrayed eccentrically in a mutual opposite direction to a small diameter portion of a nozzle in a second row.

12. A die for use in an underwater plastic granulating apparatus according to claim 8, wherein a nozzle pitch $P_5$ at a portion where said jacket is incorporated is expressed by $P_5=d_3+2t+d_1-2e$ wherein $d_3$ is a hole diameter of said jacket;

wherein t is a thickness between the jacket and each of the nozzles;

wherein $d_1$ is an opening diameter of said orifices; and wherein e is an amount of eccentricity.

* * * * *